(12) United States Patent
Ali et al.

(10) Patent No.: US 7,461,237 B2
(45) Date of Patent: Dec. 2, 2008

(54) METHOD AND APPARATUS FOR SUPPRESSING DUPLICATIVE PREFETCHES FOR BRANCH TARGET CACHE LINES

(75) Inventors: Abid Ali, San Jose, CA (US); Paul Caprioli, Mountain View, CA (US); Shailender Chaudhry, San Francisco, CA (US); Miles Lee, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 497 days.

(21) Appl. No.: 11/111,654

(22) Filed: Apr. 20, 2005

(65) Prior Publication Data

US 2006/0242365 A1    Oct. 26, 2006

(51) Int. Cl.
*G06F 9/38* (2006.01)
*G06F 9/40* (2006.01)
*G06F 9/44* (2006.01)

(52) U.S. Cl. .................................... 712/207; 712/237

(58) Field of Classification Search ................. 712/207, 712/237
See application file for complete search history.

(56) References Cited

U.S. PATENT DOCUMENTS

| 5,604,909 | A | * | 2/1997 | Joshi et al. | 712/208 |
| 5,623,615 | A | * | 4/1997 | Salem et al. | 712/238 |
| 5,958,040 | A | * | 9/1999 | Jouppi | 712/207 |
| 6,134,649 | A | * | 10/2000 | Witt | 712/204 |

* cited by examiner

*Primary Examiner*—Daniel Pan
(74) *Attorney, Agent, or Firm*—Park, Vaughan & Fleming LLP (57) ABSTRACT

A system that suppresses duplicative prefetches for branch target cache lines. During operation, the system fetches a first cache line into in a fetch buffer. The system then prefetches a second cache line, which immediately follows the first cache line, into the fetch buffer. If a control transfer instruction in the first cache line has a target instruction which is located in the second cache line, the system determines if the control transfer instruction is also located at the end of the first cache line so that a corresponding delay slot for the control transfer instruction is located at the beginning of the second cache line. If so, the system suppresses a subsequent prefetch for a target cache line containing the target instruction because the target instruction is located in the second cache line which has already been prefetched.

15 Claims, 8 Drawing Sheets

METHOD AND APPARATUS FOR SUPPRESSING DUPLICATIVE PREFETCHES FOR BRANCH TARGET CACHE LINES

BACKGROUND

1. Field of the Invention

The present invention relates to techniques for improving computer system performance. More specifically, the present invention relates to the design of a processor with a fetch unit that suppresses duplicative prefetches for branch target cache lines.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

In order to alleviate some of this performance problem, many processors provide an instruction fetch buffer which is located between the instruction cache and the instruction decode unit. An instruction buffer is configured to provide buffer space for instruction cache lines so that the instruction buffer can continue sending instructions to the fetch unit without having to access the instruction cache over and over again. In throughput processors, which support a large number of concurrently executing threads, the threads typically access a unified cache which is a shared resource. In such systems, it becomes more important to buffer up enough instructions for each thread so that other threads have a fair chance of accessing the instruction cache.

Unfortunately, inefficiencies can arise when using instruction fetch buffers, particularly when control transfer instructions (CTIs) are encountered, such as branch and jump instructions which change the flow of the instruction execution. High-performance architectures typically provide delay slot (DS) instructions, which immediately follow the CTI. This can cause problems when the CTI-DS pair gets split across cache lines. More specifically, when the fetch buffer holds more than one cache line and where consecutive cache lines are prefetched into the fetch buffer, if the target cache line happens to fall in the same cache line which contains the delay slot instruction, existing systems will access the instruction cache again to fetch the target cache line. However, in this case, the cache line already exists in the fetch buffer, so performance is lost by trying to refetch the same cache line from the instruction cache.

Hence, what is needed is a method and an apparatus which supports prefetching of cache lines into an instruction buffer without the problems described above.

SUMMARY

One embodiment of the present invention provides a system that suppresses duplicative prefetches for branch target cache lines. During operation, the system fetches a first cache line into in a fetch buffer. The system then prefetches a second cache line, which immediately follows the first cache line, into the fetch buffer. If a control transfer instruction in the first cache line has a target instruction which is located in the second cache line, the system determines if the control transfer instruction is also located at the end of the first cache line so that a corresponding delay slot for the control transfer instruction is located at the beginning of the second cache line. If so, the system suppresses a subsequent prefetch for a target cache line containing the target instruction because the target instruction is located in the second cache line which has already been prefetched.

In a variation on this embodiment, if the control transfer instruction is located at the end of the first cache line, the system retrieves the corresponding delay slot instruction from the second cache line. Otherwise, the system retrieves the corresponding delay slot instruction from the first cache line. When the control transfer instruction is subsequently encountered, the system can jump to the target instruction in the second cache line.

In a variation on this embodiment, if the control transfer instruction has a target instruction which is located in the first cache line, the system retrieves the corresponding delay slot instruction from the first cache line. When the control transfer instruction is subsequently encountered, the system can jump to the target instruction in the first cache line.

In a variation on this embodiment, if the target instruction for the control transfer instruction is not located in the first cache line and is not located in the second cache line, the system determines if the control transfer instruction is located at the end of the first cache line. If so, the system retrieves the corresponding delay slot instruction for the control transfer instruction from the second cache line. The system subsequently prefetches a target cache line containing the target instruction of the control transfer instruction into the fetch buffer. When the control transfer instruction is subsequently encountered, the system can jump to the target instruction in the target cache line.

In a variation on this embodiment, if the control transfer instruction is not located at the end of the first cache line, the system retrieves the corresponding delay slot instruction for the control transfer instruction from the first cache line. The system then terminates the prefetch for the second cache line and instead prefetches the target cache line containing the target instruction into the fetch buffer. When the control transfer instruction is subsequently encountered, the system can jump to the target instruction in the target cache line containing the target instruction.

In a variation on this embodiment, the fetch buffer contains two entries for storing cache lines.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Fetch Unit

Figure 1:
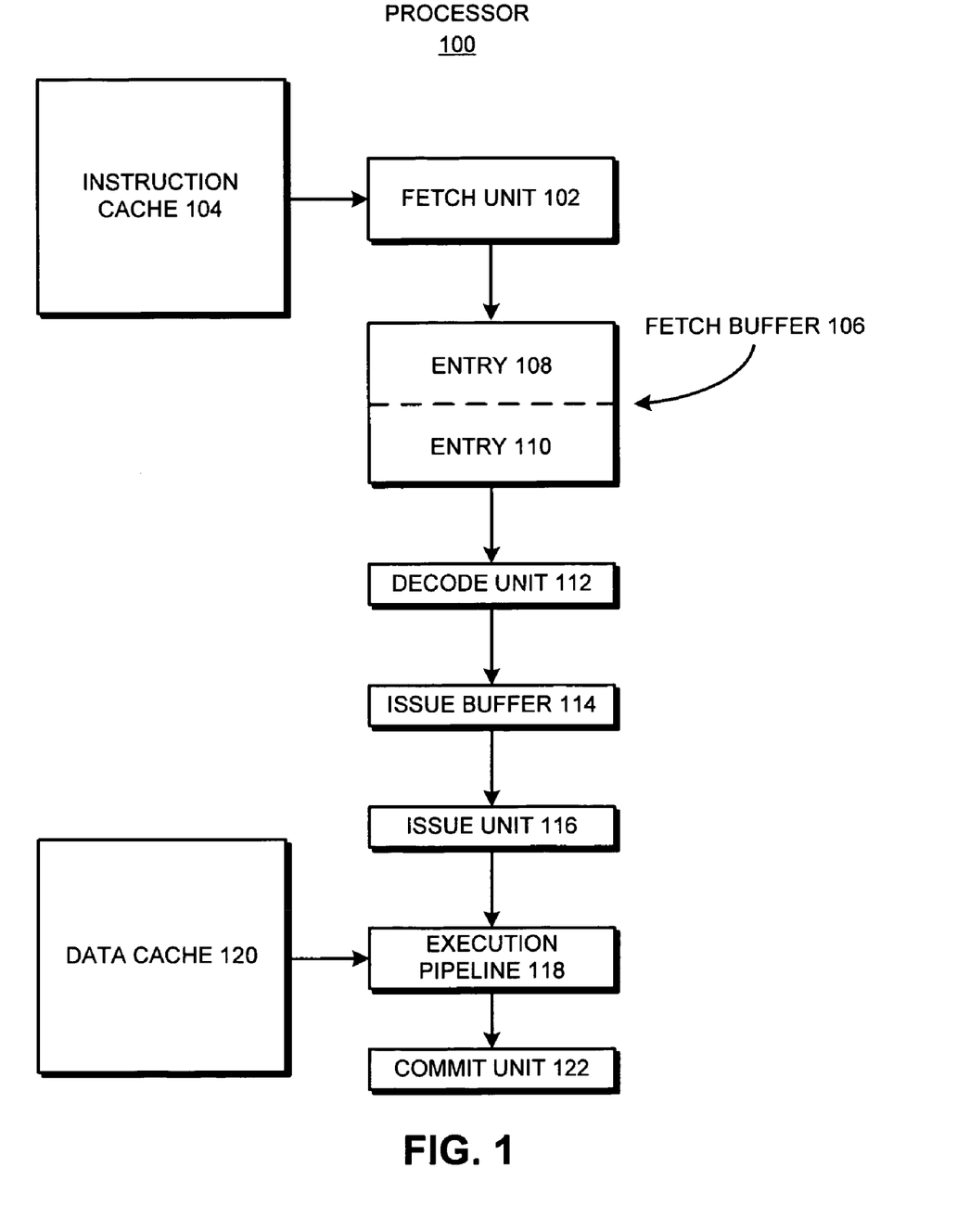
FIG. 1 presents a block diagram of a processor in accordance with an embodiment of the present invention.

FIG. 1 presents a block diagram of a processor 100 in accordance with an embodiment of the present invention. Processor 100 includes fetch unit 102, instruction cache 104, fetch buffer 106, entry 108, entry 110, decode unit 112, issue buffer 114, issue unit 116, execution pipeline 118, data cache 120, and commit unit 122. During program execution, fetch unit 102 retrieves cache lines from instruction cache 104 and stores them into fetch buffer 106. Next, decode unit 112 receives and decodes instructions from fetch buffer 106. Decode unit 112 then sends instructions to issue buffer 114, which feeds issue unit 116. Issue unit 116 then sends instructions to execution pipeline 118. During instruction execution, execution pipeline 118 retrieves data from data cache 120, if necessary. When the instruction has finished executing, the result is sent to commit unit 122 which commits the result of the instruction.

In one embodiment of the present invention, fetch buffer 106 contains two entries: entry 108 and entry 110, wherein each entry is a cache line. In one embodiment of the present invention, each cache line is 64 bytes and each instruction is 4 bytes long, so that each cache line can hold 16 instructions.

During operation, a processor fetches a first cache line into entry 108 of fetch buffer 106. It will then prefetch a second cache line, which immediately follows the first cache line, into entry 110 of fetch buffer 106. Note that fetch unit 102 can possibly service multiple fetch buffers.

Branch Types

A control transfer instruction (CTI), such as a branch or a jump instruction, can possibly change the flow of instruction execution. Furthermore, in high-performance processors, a delay slot instruction typically follows a CTI. In one embodiment of the present invention, there are three classifications for CTIs: a large branch, a medium branch, and a small branch. Note that the term "branch" is used in this specification as a short-hand for any CTI. Hence, the term "branch" can refer to branch and jump instructions or any other instruction that controls the flow of instruction execution.

Figure 2A:
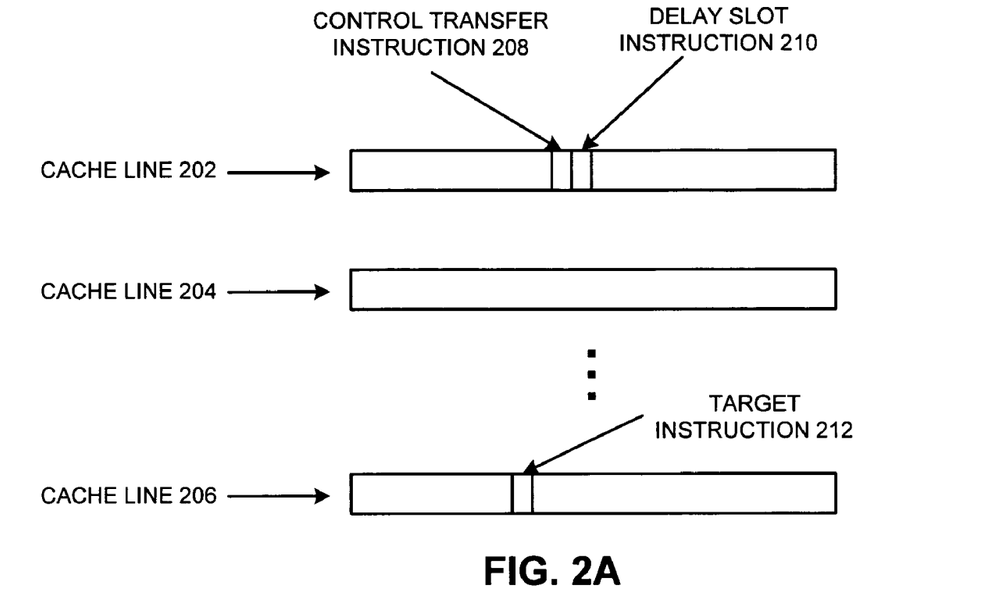
FIG. 2A illustrates a large branch where the delay slot instruction is in the same cache line as the control transfer instruction.

FIG. 2A illustrates a large branch where the delay slot instruction is located in the same cache line as the control transfer instruction. In FIG. 2A, cache line 202 contains control transfer instruction 208 and delay slot 210. Note that delay slot 210 immediately follows control transfer instruction 208. Also note that fetch unit 102 in FIG. 1 has fetched cache line 202 and has also prefetched cache line 204 into fetch buffer 106. In this case, target instruction 212 already resides in cache line 206. Since target instruction 212 is not located in either the first cache line (cache line 202) or in the cache line immediately following the first cache line (cache line 204), it is classified as a "large branch."

During program execution, control transfer instruction 208 is retrieved from the first cache line (cache line 202). Next, the corresponding delay slot instruction 210 is retrieved from cache line 202. In this case, cache line 204, is not used. Hence, fetch unit 102 suppresses the prefetch for cache line 204 and instead fetches cache line 206 into fetch buffer 106. When the CTI is encountered, the processor jumps to target instruction 212 in the cache line 206 containing the target instruction.

Figure 2B:
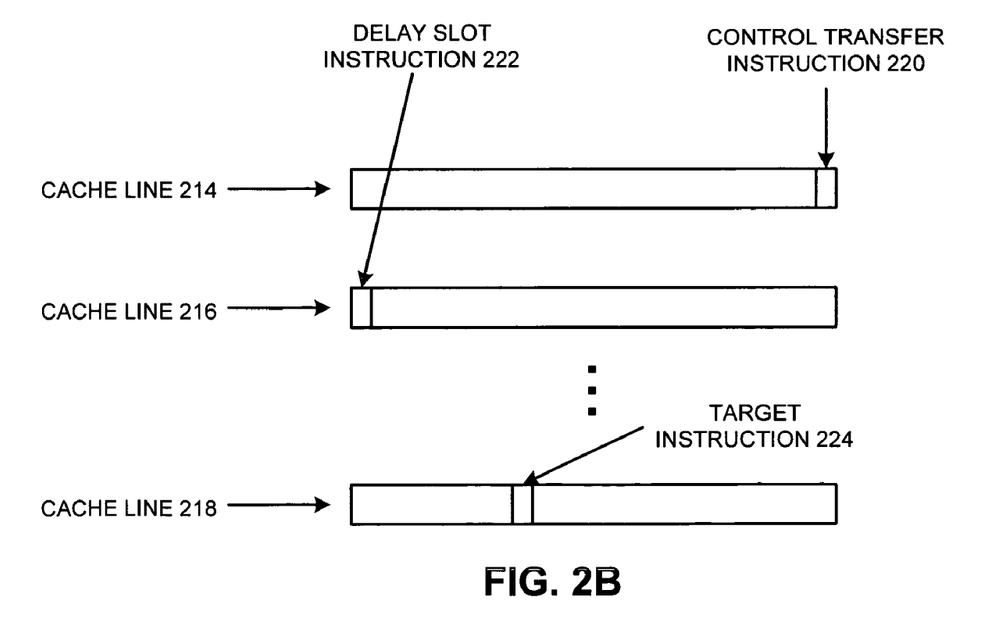
FIG. 2B illustrates a large branch where the delay slot instruction is at the beginning of the next cache line after the control transfer instruction.

FIG. 2B illustrates a large branch where the delay slot instruction is at the beginning of the next cache line following the control transfer instruction. In FIG. 2B, cache line 214 contains control transfer instruction 220. Note that control transfer instruction 220 is located at the end of cache line 214, and that cache line 216, which immediately follows cache line 214, contains the corresponding delay slot instruction 222, which is located at the beginning of cache line 216. As in the previous example, fetch unit 102 in FIG. 1 has fetched cache line 214 and prefetched cache line 216 into fetch buffer 106. In this case, target instruction 224 is located in cache line 218. Again, target instruction 224 is not in either the first cache line (cache line 214) or in the second cache line (cache line 216), and is therefore classified as a "large branch."

Control transfer instruction 220 is retrieved from the first cache line (cache line 214). Unlike the previous example, this case, cache line 216, which was speculatively prefetched, is used because delay slot instruction 222 is located at the beginning of cache line 216. Fetch unit 102 then fetches cache line 218 containing target instruction 224 into fetch buffer 106. When the CTI is encountered, the processor jumps to target instruction 224 in cache line 218.

Note that in both large branch cases, fetch unit 102 fetches the cache line containing the target instruction into fetch buffer 106. The second cache line (cache line 204 and cache line 216) may or may not be used. A more interesting case arises for a "medium branch."

Figure 3:
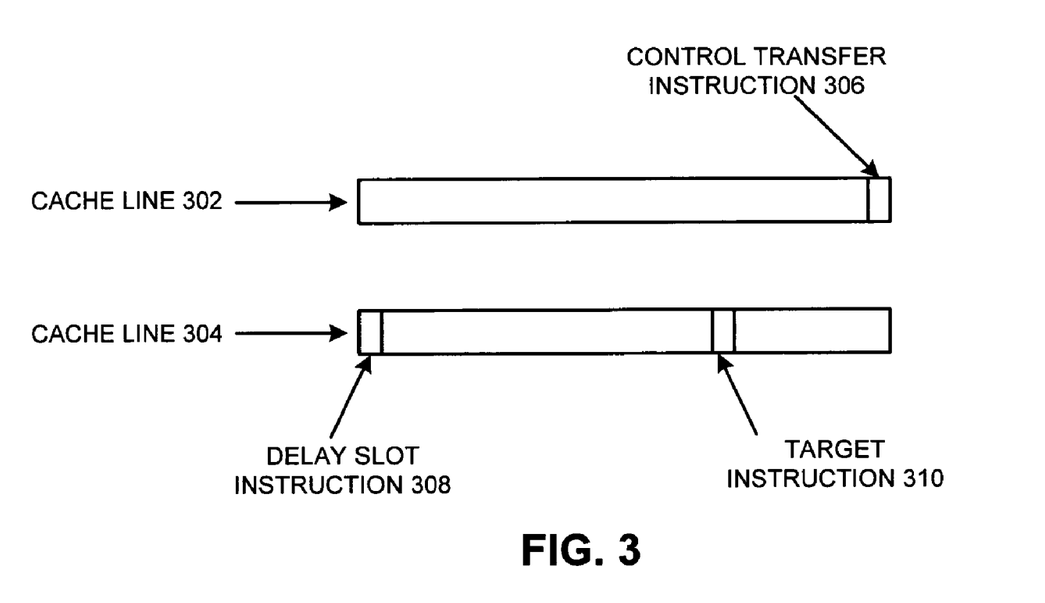
FIG. 3 illustrates a medium branch where the delay slot instruction is at the beginning of the next cache line after the control transfer instruction and the target of the control transfer instruction is on this second cache line.

FIG. 3 illustrates a medium branch where the delay slot instruction is at the beginning of the next cache line after the control transfer instruction and the target of the control transfer instruction is located in the second cache line. Cache line 302 contains control transfer instruction 306, which is located at the end of cache line 302. The corresponding delay slot 308 is located at the beginning of cache line 304, and branch target instruction 310 is also located in cache line 304.

During program execution, control transfer instruction 306 is retrieved from cache line 302 located in fetch buffer 106. Delay slot instruction 308 is then retrieved from the beginning of cache line 304, which was speculatively prefetched into fetch buffer 106. Normally, fetch unit 102 would refetch cache line 304 into fetch buffer 106. However, by taking advantage of the fact that cache line 304 is already in fetch buffer 106 and suppressing a request to refetch cache line 304, cycles will not be lost refetching cache line 304 which is already available in fetch buffer 106. When the CTI in encountered, the processor jumps to target instruction 310 in the cache line 304.

The final classification is a small branch, wherein the control transfer instruction, delay slot instruction, and target instruction are all located in the same cache line. In this case, no duplicative prefetch arises.

Process of Handling Control Transfer Instructions

Figure 4A:
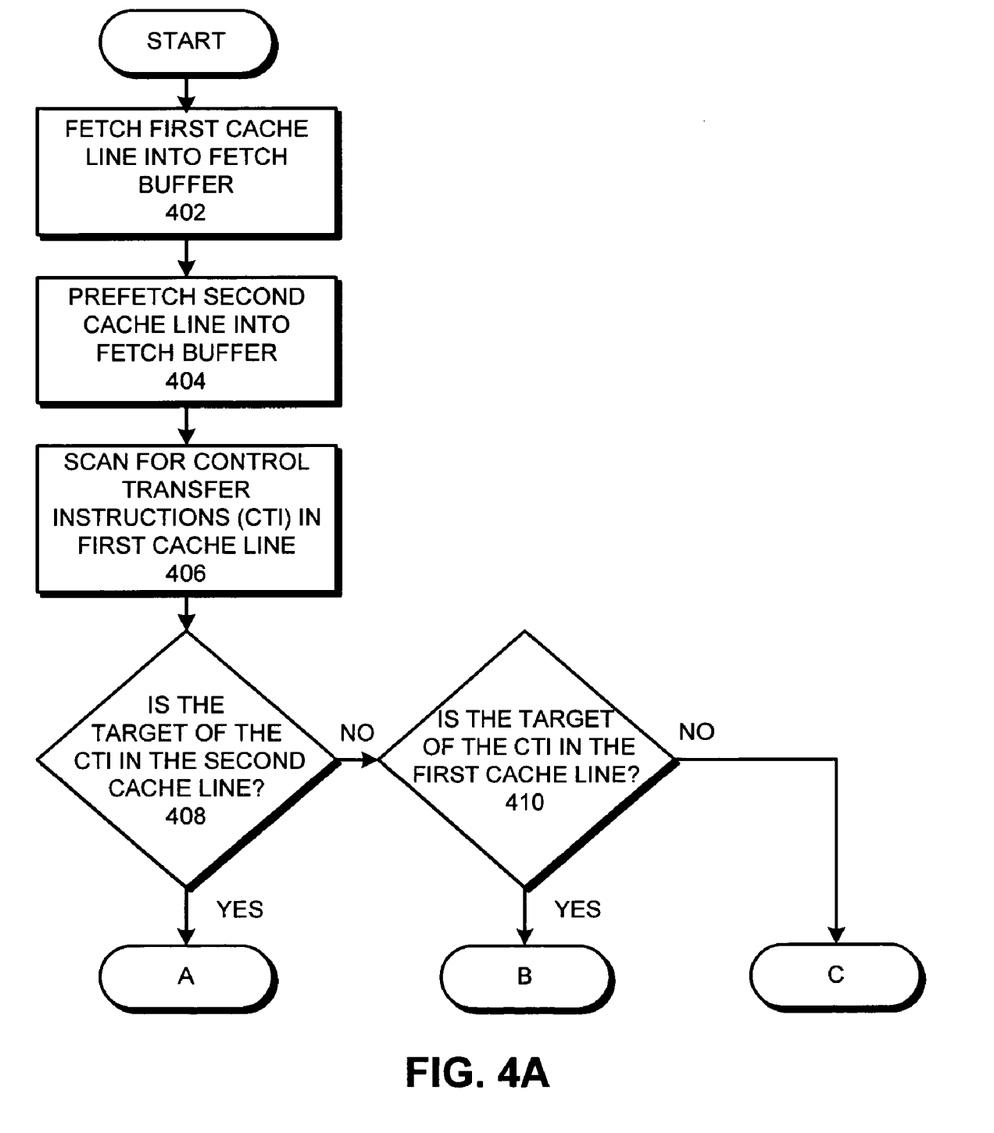
FIG. 4A presents a flow chart illustrating the process of improving performance in a processor which supports prefetching of cache lines in accordance with an embodiment of the present invention.
Figure 4B:
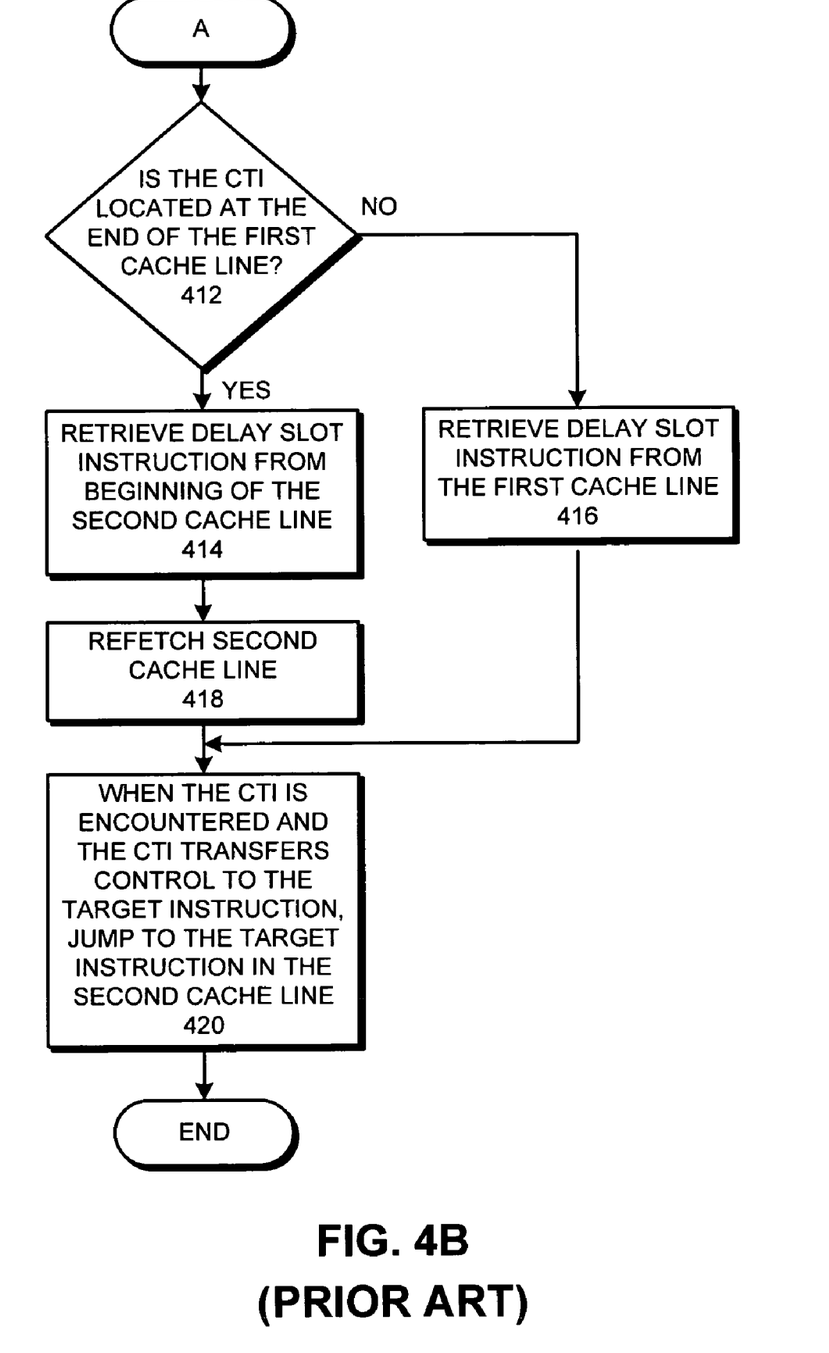
FIG. 4B presents a flow chart illustrating the process of handling a medium branch.
Figure 4C:
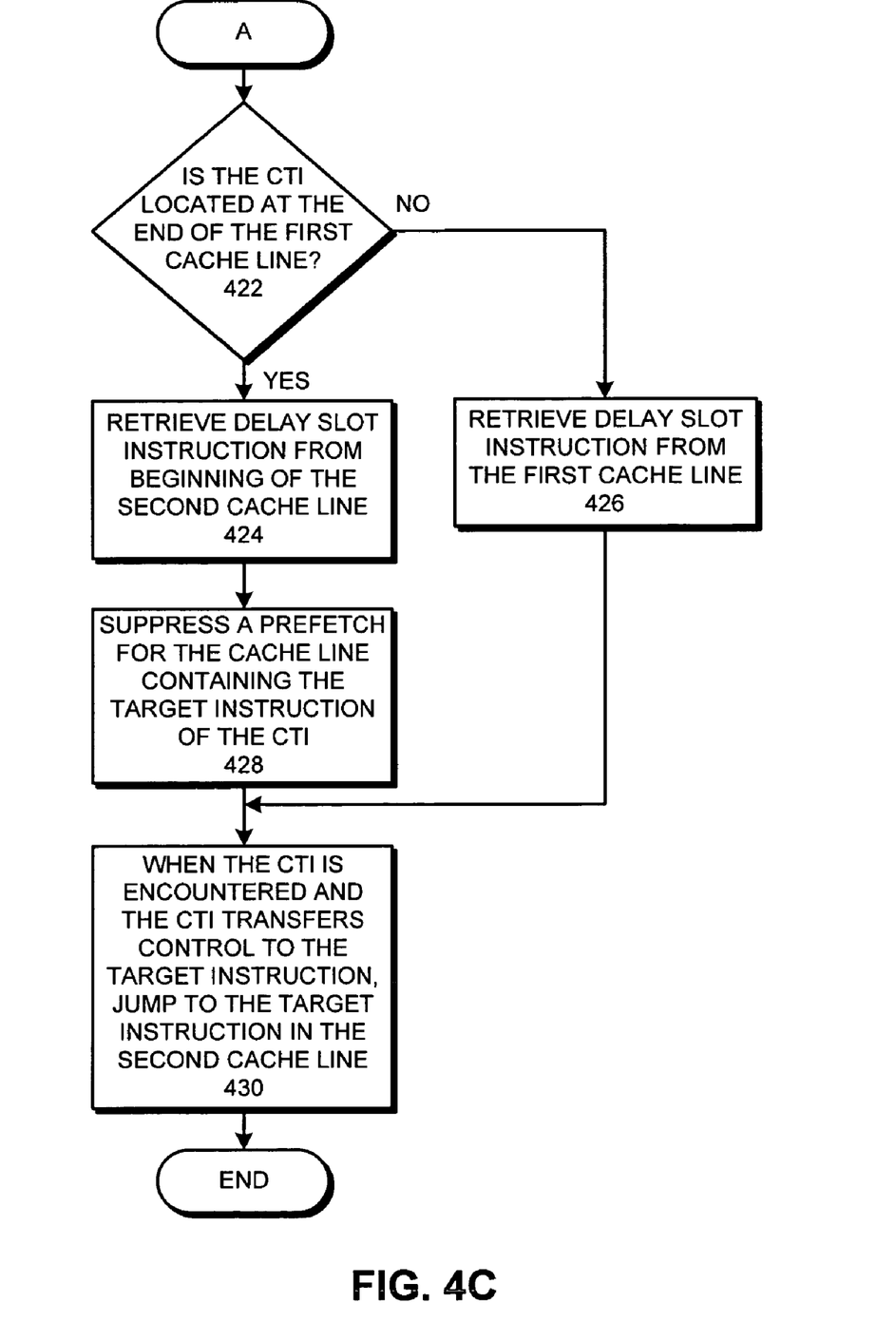
FIG. 4C presents a flow chart illustrating the process of handling a medium branch in accordance with an embodiment of the present invention.

FIG. 4A presents a flow chart illustrating the process of prefetching cache lines in accordance with an embodiment of the present invention. The process starts when the fetch unit pulls a first cache line into the fetch buffer (step 402). The fetch unit then prefetches a second cache line, which immediately follows the first cache line, into the fetch buffer (step 404). Next, the fetch unit scans the first cache line for control transfer instructions (CTIs) (step 406). If a CTI is found in the first cache line and the target of the CTI is in the second cache line, the CTI is a medium branch and the process continues in A (FIG. 4B, FIG. 4C). If the target of the CTI is not in the second cache line, the fetch unit checks to see if the target of the CTI is in the first cache line (step 410). If so, the CTI is a small branch and the process continues in B (FIG. 4D), otherwise the CTI is a large branch and the process continues in C (FIG. 4E).

FIG. 4B presents a flow chart illustrating the process of handling a medium branch in accordance with the prior art. The process first determines if the CTI is located at the end of the first cache line (step 412). If so, the delay slot instruction is retrieved from the beginning of the second cache line (step 414). The fetch unit then refetches the second cache line (step 418) because it does not take advantage of the fact that the second cache line already exists in the fetch buffer. If the CTI is not located at the end of the first cache line, the delay slot instruction is retrieved from the first cache line (step 416). When the CTI is encountered, the processor jumps to the target instruction in the second cache line (step 420).

FIG. 4C presents a flow chart illustrating the process of handling a medium branch in accordance with an embodiment of the present invention. The process starts by determining if the CTI is located at the end of the first cache line (step 422). If so, the corresponding delay slot instruction is retrieved from the beginning of the second cache line (step 424). The fetch unit then suppresses a prefetch for the cache line containing the target instruction of the CTI (step 428) because the target instruction is located in the second cache line which is already in the fetch buffer. If the CTI is not located at the end of the first cache line, the delay slot instruction is retrieved from the first cache line (step 426). When the CTI is encountered, the processor jumps to the target instruction in the second cache line (step 430).

Figure 4D:
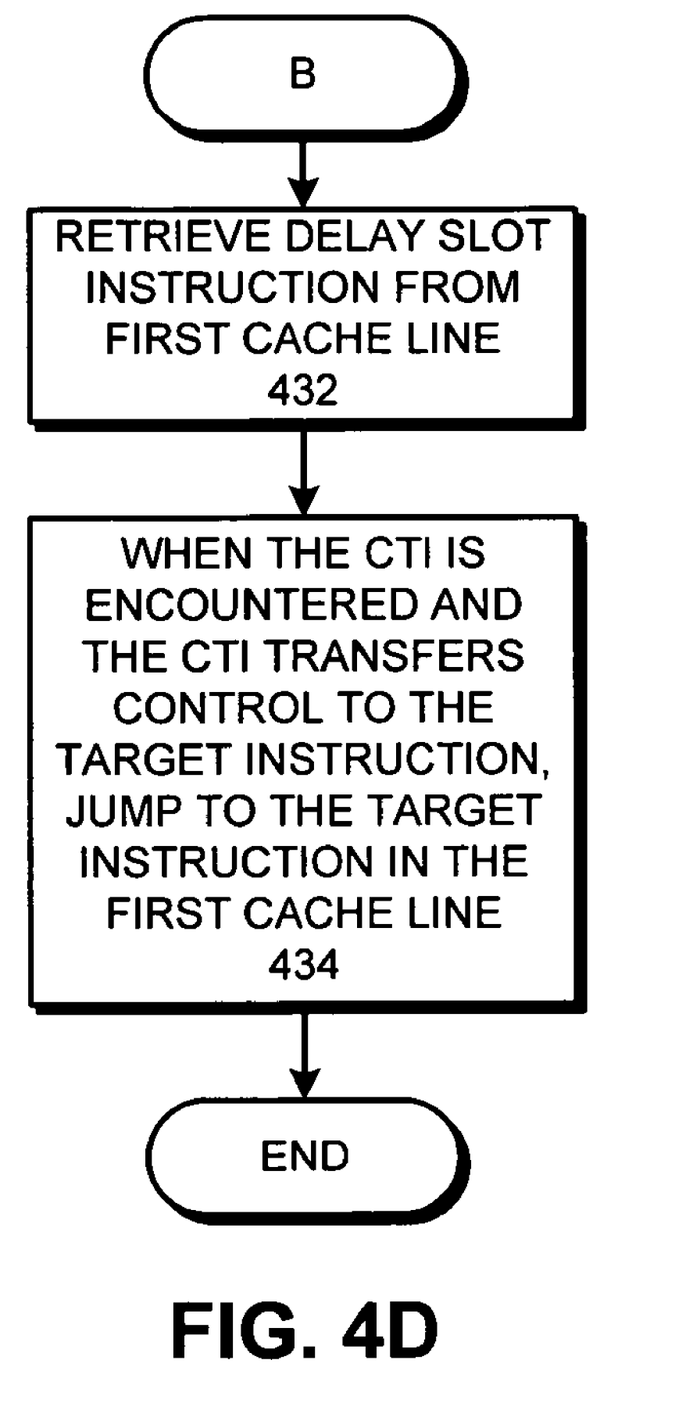
FIG. 4D presents a flow chart illustrating the process of handling a small branch in accordance with an embodiment of the present invention.
Figure 4E:
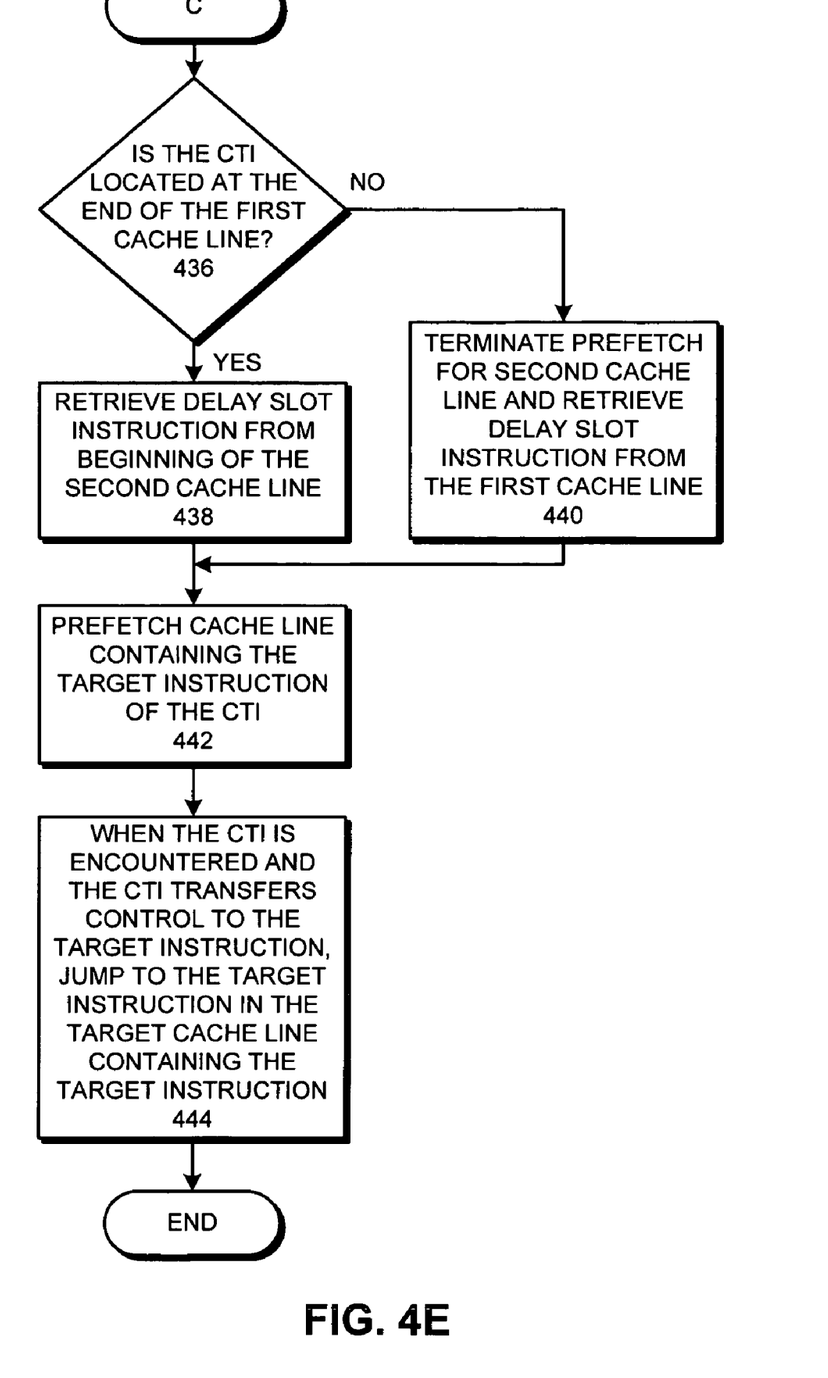
FIG. 4E presents a flow chart illustrating the process of handling a large branch in accordance with an embodiment of the present invention.

FIG. 4D presents a flow chart illustrating the process of handling a small branch in accordance with an embodiment of the present invention. During this process, the corresponding delay slot instruction is retrieved from the first cache line (step 432). When the CTI is encountered, the processor jumps to the target instruction in the first cache line (step 434). In this case, no prefetch is generated for the branch target.

FIG. 4E presents a flow chart illustrating the process of handling a large branch in accordance with an embodiment of the present invention. The process starts by determining if the CTI is located at the end of the first cache line (step 436). If so, the corresponding delay slot instruction is retrieved from the beginning of the second cache line (step 438). If the CTI is not located at the end of the first cache line, the prefetch for the second cache line is terminated and the corresponding delay slot instruction is retrieved from the first cache line (step 440). The fetch unit then prefetches the cache line containing the target instruction of the CTI (step 442). When the CTI is encountered, the processor jumps to the target instruction in the target cache line containing the target instruction (step 444).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for improving performance in a processor which supports prefetching of cache lines, comprising:
   fetching a first cache line into in a fetch buffer;
   prefetching a second cache line, which immediately follows the first cache line, into the fetch buffer;
   scanning the first cache line to determine a location for a target instruction for a control transfer instruction in the first cache line and a position for a corresponding delay slot for the control transfer instruction;
   if the control transfer instruction in the first cache line has a target instruction which is located in the second cache line, determining if the control transfer instruction is located at the end of the first cache line so that the corresponding delay slot for the control transfer instruction is located at the beginning of the second cache line;
   if so, suppressing a subsequent prefetch for a target cache line containing the target instruction because the target instruction is located in the second cache line which has already been prefetched; and
   if the target instruction for the control transfer instruction is not located in the first cache line and is not located in the second cache line, determining if the control transfer instruction is located at the end of the first cache line;
   if not,
      retrieving the corresponding delay slot instruction for the control transfer instruction from the first cache line;
      terminating the prefetch for the second cache line and instead prefetching the target cache line containing the target instruction into the fetch buffer; and
      when the control transfer instruction is encountered and the control transfer instruction transfers control to the target instruction, jumping to the target instruction in the target cache line containing the target instruction.

2. The method of claim 1,
   wherein if the control transfer instruction is located at the end of the first cache line, the method further comprises retrieving the corresponding delay slot instruction from the second cache line;
   otherwise, retrieving the corresponding delay slot instruction from the first cache line; and
   when the control transfer instruction is encountered and the control transfer instruction transfers control to the target instruction, jumping to the target instruction in the second cache line.

3. The method of claim 1, wherein if the control transfer instruction has a target instruction which is located in the first cache line, the method further comprises:
   retrieving the corresponding delay slot instruction from the first cache line; and
   when the control transfer instruction is encountered and the control transfer instruction transfers control to the target instruction, jumping to the target instruction in the first cache line.

4. The method of claim 1, wherein if the control transfer instruction is located at the end of the first cache line, the method further comprises:
retrieving the corresponding delay slot instruction for the control transfer instruction from the second cache line;
prefetching the target cache line containing the target instruction of the control transfer instruction into the fetch buffer; and
when the control transfer instruction is encountered and the control transfer instruction transfers control to the target instruction, jumping to the target instruction in the target cache line containing the target instruction.

5. The method of claim 1, wherein the fetch buffer contains two entries for storing cache lines.

6. An apparatus for improving performance in a processor which supports prefetching of cache lines, comprising:
a processor;
a cache;
a memory; and
a fetch unit;
wherein the fetch unit is configured to:
fetch a first cache line into in a fetch buffer;
prefetch a second cache line, which immediately follows the first cache line, into the fetch buffer;
scan the first cache line to determine a location for a target instruction for a control transfer instruction in the first cache line and a position for a corresponding delay slot for the control transfer instruction;
if the control transfer instruction in the first cache line has a target instruction which is located in the second cache line, to determine if the control transfer instruction is located at the end of the first cache line so that the corresponding delay slot for the control transfer instruction is located at the beginning of the second cache line; and
if so, to suppress a subsequent prefetch for a target cache line containing the target instruction because the target instruction is located in the second cache line which has already been prefetched; and
if the target instruction for the control transfer instruction is not located in the first cache line and is not located in the second cache line, determining if the control transfer instruction is located at the end of the first cache line;
if not,
retrieving the corresponding delay slot instruction for the control transfer instruction from the first cache line;
terminating the prefetch for the second cache line and instead prefetching the target cache line containing the target instruction into the fetch buffer; and
when the control transfer instruction is encountered and the control transfer instruction transfers control to the target instruction, jumping to the target instruction in the target cache line containing the target instruction.

7. The apparatus of claim 6,
wherein if the control transfer instruction is located at the end of the first cache line, the fetch unit is configured to retrieve the corresponding delay slot instruction from the second cache line;
otherwise the fetch unit is configured to retrieve the corresponding delay slot instruction from the first cache line; and
when the control transfer instruction is encountered and the control transfer instruction transfers control to the target instruction, the processor is configured to jump to the target instruction in the second cache line.

8. The apparatus of claim 6, wherein if the control transfer instruction has a target instruction which is located in the first cache line, the fetch unit is configured to:
retrieve the corresponding delay slot instruction from the first cache line; and
when the control transfer instruction is encountered and the control transfer instruction transfers control to the target instruction, the processor is configured to jump to the target instruction in the first cache line.

9. The apparatus of claim 6, wherein if the control transfer instruction is located at the end of the first cache line, the fetch unit is configured to:
retrieve the corresponding delay slot instruction for the control transfer instruction from the second cache line;
prefetch the target cache line containing the target instruction of the control transfer instruction into the fetch buffer; and
when the control transfer instruction is encountered and the control transfer instruction transfers control to the target instruction, the processor is configured to jump to the target instruction in the target cache line containing the target instruction.

10. The apparatus of claim 6, wherein the fetch buffer contains two entries for storing cache lines.

11. A computer system including a fetch unit that improves performance in a processor which supports prefetching of cache lines, comprising:
a processor;
a cache;
a memory; and
a fetch unit;
wherein the fetch unit is configured to:
fetch a first cache line into in a fetch buffer;
prefetch a second cache line, which immediately follows the first cache line, into the fetch buffer;
scan the first cache line to determine a location for a target instruction for a control transfer instruction in the first cache line and a position for a corresponding delay slot for the control transfer instruction;
if the control transfer instruction in the first cache line has a target instruction which is located in the second cache line, to determine if the control transfer instruction is located at the end of the first cache line so that the corresponding delay slot for the control transfer instruction is located at the beginning of the second cache line; and
if so, to suppress a subsequent prefetch for a target cache line containing the target instruction because the target instruction is located in the second cache line which has already been prefetched; and
if the target instruction for the control transfer instruction is not located in the first cache line and is not located in the second cache line, determining if the control transfer instruction is located at the end of the first cache line;
if not,
retrieving the corresponding delay slot instruction for the control transfer instruction from the first cache line;
terminating the prefetch for the second cache line and instead prefetching the target cache line containing the target instruction into the fetch buffer; and
when the control transfer instruction is encountered and the control transfer instruction transfers control to the target instruction, jumping to the target instruction in the target cache line containing the target instruction.

12. The computer system of claim 11, wherein if the control transfer instruction is located at the end of the first cache line, the fetch unit is configured to retrieve the corresponding delay slot instruction from the second cache line;

otherwise, the fetch unit is configured to retrieve the corresponding delay slot instruction from the first cache line; and when the control transfer instruction is encountered and the control transfer instruction transfers control to the target instruction, the processor is configured to jump to the target instruction in the second cache line.

13. The computer system of claim 11, wherein if the control transfer instruction has a target instruction which is located in the first cache line, the fetch unit is configured to:

retrieve the corresponding delay slot instruction from the first cache line; and when the control transfer instruction is encountered and the control transfer instruction transfers control to the target instruction, the processor is configured to jump to the target instruction in the first cache line.

14. The computer system of claim 11, wherein if the control transfer instruction is located at the end of the first cache line, the fetch unit is configured to:

retrieve the corresponding delay slot instruction for the control transfer instruction from the second cache line;

prefetch the target cache line containing the target instruction of the control transfer instruction into the fetch buffer; and when the control transfer instruction is encountered and the control transfer instruction transfers control to the target instruction, the processor is configured to jump to the target instruction in the target cache line containing the target instruction.

15. The computer system of claim 11, wherein the fetch buffer contains two entries for storing cache lines.

* * * * *